QUATERNARY DIFFERENTIAL-PHASE-MODULATED PCM REPEATER

Filed Aug. 8, 1967 2 Sheets-Sheet 1

INVENTOR
J. E. GOELL
BY Sylvan Sherman
ATTORNEY

July 7, 1970 J. E. GOELL 3,519,936

QUATERNARY DIFFERENTIAL-PHASE-MODULATED PCM REPEATER

Filed Aug. 8, 1967 2 Sheets-Sheet 2

United States Patent Office 3,519,936

Patented July 7, 1970

3,519,936

QUATERNARY DIFFERENTIAL-PHASE-MODULATED PCM REPEATER

James E. Goell, Middletown, N.J., assignor to Bell Telephone Laboratories, Incorporated, Murray Hill, N.J., a corporation of New York Filed Aug. 8, 1967, Ser. No. 659,203
Int. Cl. H04b *7/16;* H04l *27/18*
U.S. Cl. 325—7 5 Claims

ABSTRACT OF THE DISCLOSURE

The application describes apparatus for utilizing the two baseband signals $V_1$ and $V_2$, derived from a quaternary differential phase detector, to regenerate a differential-phase-modulated PCM signal.

In accordance with the invention, a translator converts signals $V_1$ and $V_2$ into a single signal, $\mu_1+\mu_2$, which drives a voltage-sensitive oscillator. The translator includes a signal divider which divides the $V_1$ signal into two components. One component constitutes the $\mu_1$ signal. The other component and the $V_2$ signal are coupled to a sign generator which generates the $\mu_2$ signal such that $$\text{sgn. } \mu_2 = -(\text{sgn. } V_1)(\text{sgn. } V_2)$$

The $\mu_1$ and $\mu_2$ signals are then combined in an adder to produce the regenerator drive signal. Amplifiers are also included to adjust the relative amplitudes of $\mu_1$ and $\mu_2$ to yield the required differential phase shift.

This invention relates to regenerative repeaters for use in four-state, differential-phase-modulated PCM signals, also referred to as differentially coherent phase-shift-keyed (DCPSK) modulation.

BACKGROUND OF THE INVENTION

In the copending application by W. D. Warters, Ser. No. 568,893, filed July 29, 1966, and assigned to applicant's assignee, there is described a two-state, differential-phase-modulated PCM communication system. In this system, the high frequency signal is frequency modulated above and below some reference frequency to produce an equivalent phase modulation of either +90 degrees or —90 degrees. The various advantages of such a system are described by Warters, as are various arrangements for detecting and regenerating the signal.

It is well known that more efficient use can be made of the frequency spectrum by increasing the number of possible signal states from two to more than two. For example, a four-state, or quaternary system, permits the combining and transmission, along the same transmission system, of two binary-encoded signals. In general, a $2n$-state system would permit the multiplexing of $n$ binary-encoded signals.

SUMMARY OF THE INVENTION

The present invention relates to apparatus for regenerating a quaternary differential-phase-modulated (DPM) signal in which the differential phase shift between signals in adjacent time slots is either $\pi/4$, $-\pi/4$, $3\pi/4$ or $-3\pi/4$ radians.

In the copending application by W. H. Hubbard, Ser. No. 659,209, filed Aug. 8, 1967, there is described a quaternary differential phase detector which generates a pair of output signals $V_1$ and $V_2$ whose polarities are indicative of the four possible phase states of the signal. In particular, output signal $V_1$ is indicative of the sign (±) of the phase deviation, while the polarity of signal $V_2$ is indicative of the amplitude ($\pi/4$ or $3\pi/4$ radians) of the phase deviation.

The apparatus to be described herein, includes a remodulator which generates the quaternary DPM signal, and a translator which converts signals $V_1$ and $V_2$ to a second pair of signals, $\mu_1$ and $\mu_2$, capable of operating the remodulator. Since, as explained hereinabove, the output from the quaternary differential phase detector consists of two signals $V_1$ and $V_2$, it is the function of the translator to utilize the information contained in these signals and to generate a single signal capable of driving the remodulator.

In accordance with the present invention, the translator converts signals $V_1$ and $V_2$ to a second pair of signals $\mu_1$ and $\mu_2$ such that $$\text{sgn. } \mu_1 = \text{sgn. } V_1$$

and $$\text{sgn. } \mu_2 = -(\text{sgn. } V_1)(\text{sgn. } V_2)$$

where $\mu_1+\mu_2$ is a function of the required differential phase shift.

In the illustrative embodiment of the invention, to be described in greater detail hereinbelow, the remodulator is a voltage-sensitive oscillator whose instantaneous frequency is varied in response to an input voltage applied thereto. Assuming, for purposes of illustration, an approximately linear voltage-frequency characteristic for the remodulator, proper regeneration occurs when $\mu_1+\mu_2$ is linearly proportional to the differential phase shift. This is obtained by making $/\mu_1/=2/\mu_2/$.

An ilustrative translator comprises a power divider, a sign generator and a signal adder. The power divider divides the signal into two components. One component is amplified to become the $\mu_1$ signal. The other component is coupled to the sign generator, along with signal $V_2$, to generate the $\mu_2$ signal. The two signals are then summed in the adder and coupled to the remodulator. The amplitude and polarity of each of the translated signals $\mu_1$ and $\mu_2$ are separately adjusted in accordance with the requirements of the remodulator to produce the required phase deviation.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
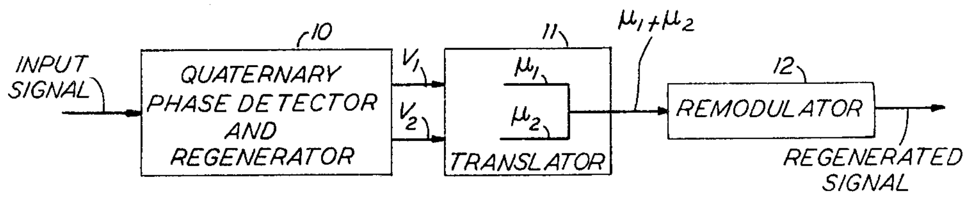
FIG. 1 shows, in block diagram, a portion of a repeater for use in a quaternary differential-phase-modulated PCM system including a quaternary differential phase detector and regenerator, a translator and a remodulator.
Figure 2:
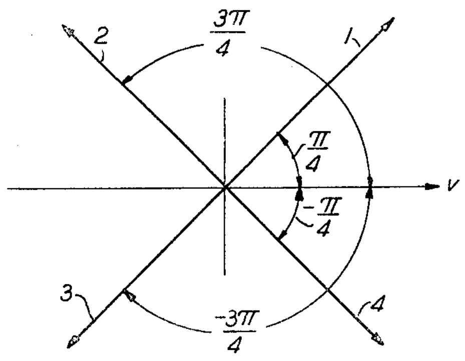
FIG. 2, included for purposes of explanation, shows the four possible phase changes the signal can experience between successive sampling intervals.

Referring to the drawings, FIG. 1 shows, in block diagram, a portion of a PCM repeater to which the invention relates. Included in FIG. 1 are a quaternary differential phase detector and regenerator 10, a translator 11, and a remodulator 12. In principle the repeater can be adapted to regenerate any four-level differential-phase-modulated PCM signal. In particular, however, the four-level signal to which the present invention relates is characterized by a constant-amplitude, alternating current wave whose phase is shifted by either $\pi/4$, $-\pi/4$, $+3\pi/4$ or $-3\pi/4$ radians between successive time slots. The signal is represented in FIG. 2 by a vector $v$, depicting the signal phase at any sampling instant, and by vectors 1, 2, 3 and 4, depicting the four possible phase states at the next sampling instant. For example, the phase can deviate by $\pi/4$ radians, as represented by vector 1, or by any of the other amounts indicated above, as represented by vectors 2, 3 and 4. The function of the arrangement of FIG. 1 is to determine the magnitude and sign of this phase shift and to regenerate the signal.

In the copending application by Hubbard, referred to hereinabove, the quaternary phase detector is described in detail. For the purpose of the present discussion it is sufficient to note merely that the detector generates a pair of output signals $V_1$ and $V_2$ as summarized in Table I.

TABLE I

| Differential phase shift | $V_1$ | $V_2$ |
|---|---|---|
| $\pi/4$ | 1 | 1 |
| $3\pi/4$ | 1 | −1 |
| $-\pi/4$ | −1 | 1 |
| $-3\pi/4$ | −1 | −1 |

As can be seen, the polarity of output signal $V_1$ is indicative of the sign (±) of the differential phase shift, while the polarity of output signal $V_2$ is indicative of the amplitude ($\pi/4$ or $3\pi/4$) of the differential phase shift. Accordingly, these two signals contain all of the information required either to reconstruct the original baseband, or to regenerate the high frequency signal. The absolute amplitudes of signals $V_1$ and $V_2$ can be arbitrarily adjusted by the inclusion of an amplifier in either or both signal paths.

The manner in which the information contained in signals $V_1$ and $V_2$ is used depends upon the particular application at hand. In accordance with the present invention, which relates to regenerative repeaters, the information contained in signals $V_1$ and $V_2$ is used to regenerate the differential phase modulated, alternating current signal. The manner in which this is accomplished is based upon the fact that a frequency varying signal $f(t)$ undergoes a phase shift $\Delta\varphi$, measured relative to a reference signal at frequency $f_0$, that is given by $$\Delta\varphi=2\pi\int_{t_1}^{t_2}[f(t)-f_0]dt$$

where the integration is over the time interval $t_2-t_1$. In a PCM system, the integration is taken over a period equal to one time slot.

Thus, means are provided for combining signals $V_1$ and $V_2$ in such a manner so as to produce a single signal which, when applied to the remodulator, is capable of regenerating the desired alternating current signal.

Figure 3:
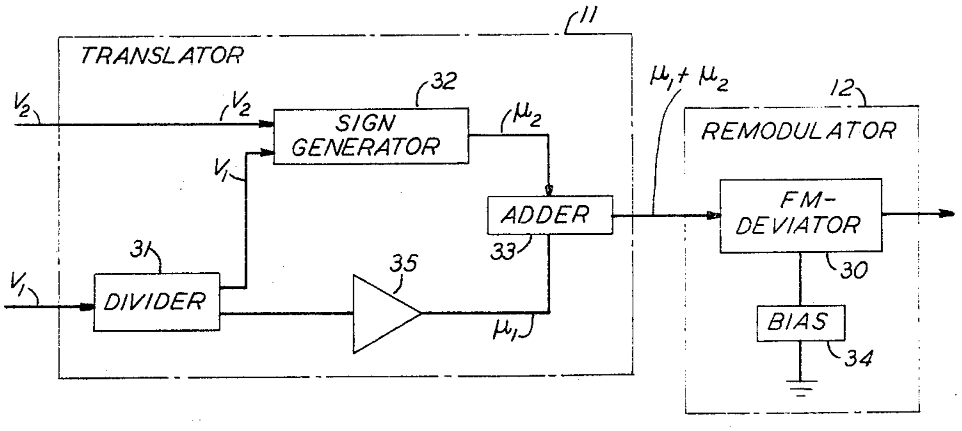
FIG. 3 shows, in block diagram, the details of a translator and a remodulator in accordance with the invention.

FIG. 3 shows, in block diagram, details of a translator and a remodulator in accordance with the invention. As depicted in FIG. 3, remodulator 12 comprises an FM-deviator 30 which can be any variety of voltage-controlled oscillator, such as a tunnel diode oscillator, whose frequency of oscillation is a function of the bias applied thereto. The unmodulated oscillator frequency is typicaly established by a bias source 34. Frequency modulation is produced by signal $\mu_1+\mu_2$ coupled to deviator 30 in a manner to vary its instantaneous bias an amount sufficient to produce the desired phase deviation $\Delta\varphi$. Assuming, for purposes of discussion, a linear frequency versus bias characteristic for the oscillator, the relative amplitude and the polarity of the driving signal $\mu_1+\mu_2$ for each of the four possible phase states is given in Table II.

TABLE II

| Differential phase shift: | $\mu_1+\mu_2$ |
|---|---|
| $\pi/4$ | +1 |
| $3\pi/4$ | +3 |
| $-\pi/4$ | −1 |
| $-3\pi/4$ | −3 |

A translator for generating the required drive signal, as illustrated in FIG. 3, comprises a divider 31, a sign generator 32 and an adder 33. An ampifier 35 is also shown for reasons which will be explained in greater detail hereinbelow.

In operation, signal $V_1$ is divided by divider 31 into two components. One component of $V_1$ constitutes the $\mu_1$ signal. The other component is coupled to sign generator 32 along with signal $V_2$. The sign generator operates upon signals $V_1$ and $V_2$ to produce a signal $\mu_2$ whose polarity (sign) depends upon the polarities (signs) of both $V_1$ and $V_2$.

Signals $\mu_1$ and $\mu_2$ are then combined in adder 33 to produce the remodulator drive signal $\mu_1+\mu_2$.

The translator shown in FIG. 3 also includes an amplifier 35 to adjust the amplitude of $\mu_1$ relative to $\mu_2$. In the particular embodiment of the invention described herein, $|\mu_1|=2|\mu_2|$. In addition, the sign of $\mu_2$ is made to be negative when $V_1$ and $V_2$ have the same polarities, and positive when $V_1$ and $V_2$ have opposite polarities. When both of these conditions are met, the relationship between the phase deviation and the various signals is as shown in Table III.

TABLE III

| Differential phase deviation | $V_1$ | $V_2$ | $\mu_1$ | $\mu_2$ | $\mu_1+\mu_2$ |
|---|---|---|---|---|---|
| $\pi/4$ | 1 | 1 | 2 | −1 | +1 |
| $3\pi/4$ | 1 | −1 | 2 | +1 | +3 |
| $-\pi/4$ | −1 | +1 | −2 | +1 | −1 |
| $-3\pi/4$ | −1 | −1 | −2 | −1 | −3 |

It will be noted that the $\mu_1+\mu_2$ signals satisfy the amplitude and polarity requirements of the remodulator drive signal, as given in Table II.

Figure 4:
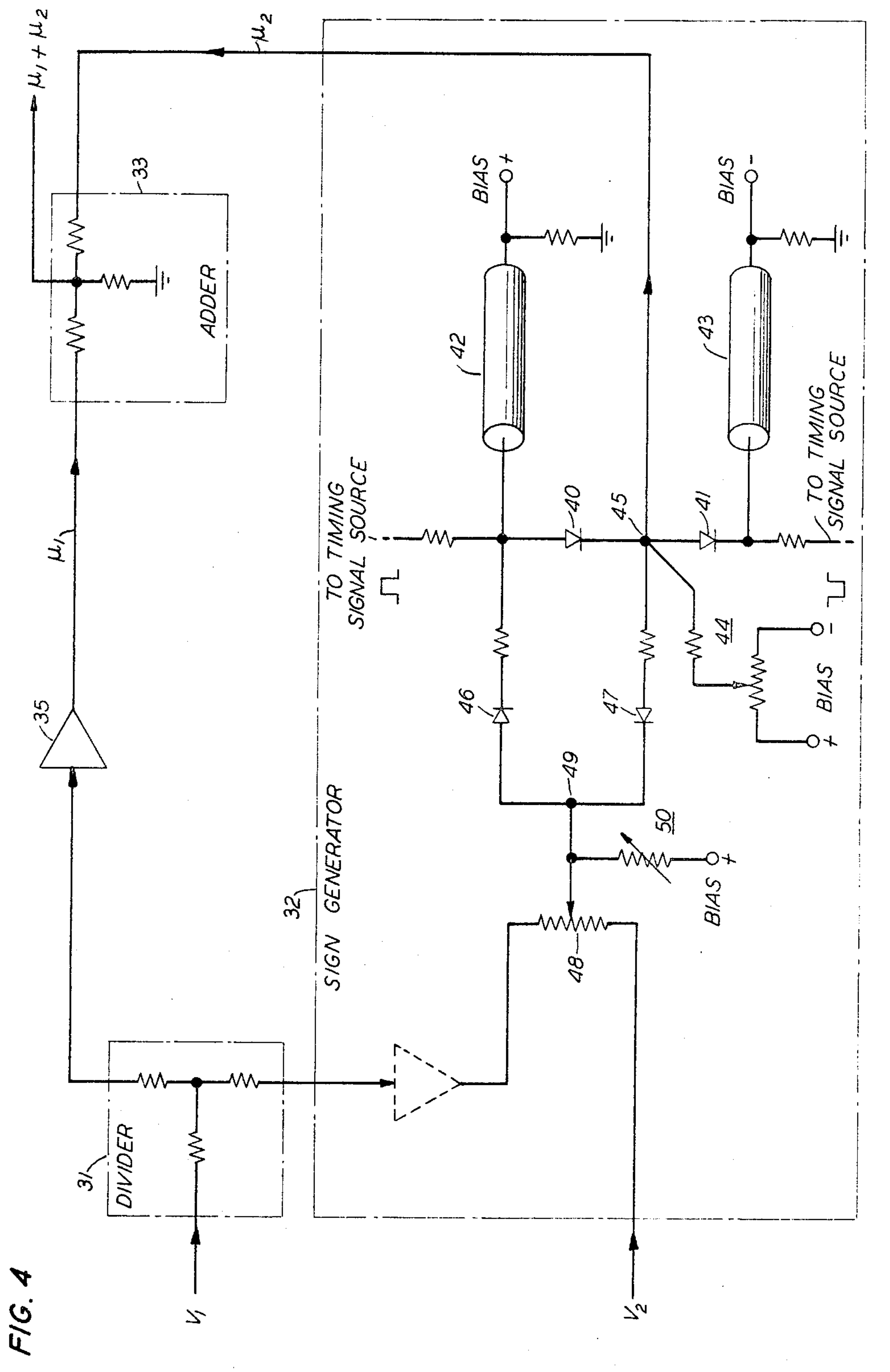
FIG. 4 shows the circuit details of an illustrative sign generator for use in the translator.

One illustrative translator arrangement for generating the remodulator drive signal $\mu_1+\mu_2$ is given in FIG. 4, which shows the circuit details of divider 31, adder 33 and sign generator 32. Signal $V_1$, derived from the quaternary phase detector, is coupled to the divider wherein it is divided into two components. One of these components is coupled to the adder circuit as signal $\mu_1$. An amplifier 35 is advantageously included in the $\mu_1$ signal circuit to maintain the proper level of the $\mu_1$ signal. The other $V_1$ component is coupled to the sign generator along with signal $V_2$.

The sign generator examines the polarity of the $V_1$ and $V_2$ signals. If they are the same, both positive or both negative, an output signal of one polarity is generated. If, however, the $V_1$ and $V_2$ signals are of different polarities, an output signal of opposite polarity is produced. In the particular illustrative embodiment shown in FIG. 4, the polarity of output signal $\mu_2$ is negative when the signs of $V_1$ and $V_2$ are the same, and positive when the signs of $V_1$ and $V_2$ are different. That is, $$\text{sgn. }\mu_2=-(\text{sgn. }V_1)(\text{sgn. }V_2) \qquad (1)$$

Basically, the sign generator is a modified "Goto-pair," comprising a pair of series-connected diodes 40 and 41, and associated biasing circuits. (For a detailed description of the Goto-pair circuit, see "Some New High-Speed Tunnel-Diode Logic Circuits," by M. S. Axelrod et al., I.B.M. Journal, April 1962, pp. 158–169.)

Each of the diodes 40 and 41 is characterized by a current-voltage curve which includes first and second positive resistance regions, and a negative resistance region therebetween. The diodes are biased, through the lengths of transmission line 42 and 43, at operating points within their first positive resistance regions. A second biasing circuit, connected to the common junction 45 between the two diodes is used to establish a slight imbalance in the diode biases for reasons which are explained hereinbelow.

In operation, a balanced timing pulse, synchronized with the bit rate of the differential phase modulated signal, is applied across the diodes. The polarity and amplitude of the timing pulse is such as to drive the operating points of both diodes towards their negative resistance regions. Depending upon which one of the diodes reaches its negative resistance region first, one or the other diode switches to an operating point in its second positive resistance region, producing either a positive or a negative output pulse at their common junction 45.

In accordance with the present invention, the biases are adjusted such that in the absence of any other signals, diode 41 switches in response to a timing pulse, producing a positive output signal. In order to produce a negative output pulse, means, comprising a second pair of diodes 46 and 47 and resistor 48, are provided. The second pair of diodes, which are connected series-aiding across diode 40, are poled oppositely to diode 40 and are connected at their common junction 49 to an adjustable tap on resistor 48. A bias circuit 50 adjusts the biases across diodes 46 and 47.

In operation, signals $V_1$ and $V_2$ are connected, respectively at opposite ends of resistor 48. When both $V_1$ and $V_2$ are positive, current flows from resistor 48 through diode 46, to diode 40 and, hence, to ground through the adder circuit 33. This additional current through diode 40 increases the voltage across diode 40, thereby causing it to switch in response to a timing pulse, instead of diode 41, and to produce a negative output pulse. Similarly, when both $V_1$ and $V_2$ are negative, current is diverted away from diode 41 and towards resistor 48 through diode 47. The effect of this is to reduce the bias across diode 41 relative to the bias across diode 40 so that the latter diode switches in response to the timing pulse, thereby producing a negative output pulse.

If, on the other hand, $V_1$ and $V_2$ are of opposite polarity, the tap on resistor 48 is adjusted so that no net current flows towards resistor 48 to disturb the bias settings on diodes 40 and 41. As a result, diode 41 switches, thereby producing a positive output pulse. Thus, the translator illustrated in FIG. 4 satisfies the requirements of Equation 1 in that $\mu_2$ is positive when the polarities of $V_1$ and $V_2$ are different, and negative when the polarities of $V_1$ and $V_2$ are the same.

Having generated the two signals $\mu_1$ and $\mu_2$, they are added in adder 33 to produce the remodulator drive signal $\mu_1+\mu_2$.

In the particular situation where the voltage-frequency characteristic of the remodulator is linear, the gain of amplifier 35 is adjusted such that $|\mu_1|=2|\mu_2|$. Other voltage-frequency remodulator characteristics will, of course, require other adjustments to regenerate the proper differential-phase-modulated signal.

It should be noted that the indicated polarities of the various signals $V_1$, $V_2$, $\mu_1$ and $\mu_2$ are merely illustrative. By the simple expedient of reversing diode connections, or by the inclusion of amplifiers, other combinations of signal polarities can be devised to produce the required regenerated output signal. It should also be noted that the specific translator and remodulator circuits shown are merely intended to be illustrative, and that other circuits can just as readily be used. For example, instead of separately regenerating the $V_1$ and $V_2$ signals immediately following detection, as is done in the copending application by Hubbard, the $V_1$ signal can be regenerated by means of a regenerator located in the $\mu_1$ circuit between divider 31 and adder 33, while the sign generator 32 itself also doubles as a regenerator for the $\mu_2$ signal. In addition, it is understood that amplifiers, which have not been shown, would typically be included to control the amplitude of the various signals. Thus, in all cases it is understood that the above-described arrangement is illustrative of but one of the many possible specific embodiments which can represent applications of the principles of the invention. Numerous and varied other arrangements can readily be devised in accordance with these principles to those skilled in the art without departing from the spirit and scope of the invention.

What is claimed is:

1. For use in a quaternary phase modulated communications system;

a translator for converting a first pair of signals $V_1$ and $V_2$ into a second pair of signals $\mu_1$ and $\mu_2$ such that $$\text{sgn. } \mu_1 = \text{sgn. } V_1$$

$$\text{sgn. } \mu_2 = -(\text{sgn. } V_1)(\text{sgn. } V_2)$$

and for summing said $\mu_1$ and $\mu_2$ signals;

said translator including:

a signal divider for dividing said $V_1$ signal into two components;

a sign generator for generating said $\mu_2$ signal;

and an adder for adding said $\mu_1$ and said $\mu_2$ signals to form an output signal $\mu_1+\mu_2$;

means for coupling one of said $V_1$ components to said adder, said one component constituting said $\mu_1$ signal;

means for coupling the other of said $V_1$ components to said sign generator;

means for coupling said $V_2$ signal to said sign generator;

means for coupling signal $\mu_2$ between said sign generator and said adder;

and means for extracting said output signal $\mu_1+\mu_2$ from said adder.

2. The apparatus according to claim 1 including:

an oscillator whose output frequency varies in response to an externally applied signal;

and means for applying said output signal $\mu_1+\mu_2$ thereto, thereby frequency modulating said oscillator.

3. The apparatus according to claim 1 wherein said converting means includes a sign generator comprising:

first and second diodes, each having a current-voltage characteristic which includes first and second positive resistance regions and a negative resistance region therebetween;

said diodes being connected series-aiding and biased at operating points within their first positive resistance regions;

means for applying timing pulses across said diodes of a polarity and amplitude sufficient to drive said diodes into their negative resistance regions, thereby causing one or the other of said diodes to switch to the second positive region of its current-voltage characteristic;

characterized in that the bias applied to said diodes are different such that one of said diodes switches in response to said timing pulses in preference to the other of said diodes;

means, responsive to said signals $V_1$ and $V_2$, for changing the relative bias across said diodes such that the other of said diodes switches in response to said timing pulse when the polarities of said signals $V_1$ and $V_2$ are the same;

and means for coupling a signal out of said generator at the common junction between said diodes.

4. The sign generator according to claim 3 wherein a positive output signal is produced when $V_1$ and $V_2$ have different polarities;

and wherein a negative output pulse is produced when signals $V_1$ and $V_2$ have the same polarity.

5. In a quaternary differential-phase-modulated communication system, apparatus for regenerating an alternating current signal whose phase is shifted by either $\pi/4$, $-\pi/4$, $3\pi/4$ or $-3\pi/4$ radians during successive time intervals;

said apparatus including:

means for converting a first pair of signals $V_1$ and $V_2$ into a second pair of signals $\mu_1$ and $\mu_2$ such that $$\text{sgn. } \mu_1 = \text{sgn. } V_1$$

and $$\text{sgn. } \mu_2 = -(\text{sgn. } V_1)(\text{sgn. } V_2)$$

where the polarities of said $V_1$ and $V_2$ signals are indicative of the sign and magnitude, respectively, of the differetnial phase shift of said alternating current signal during said successive time iintervals;

means for summing said $\mu_1$ and $\mu_2$ signals to produce an output signal $\mu_1+\mu_2$;

an oscillator whose output frequency varies in response to an externally applied signal;

and means for applying said output signal thereto, thereby frequency modulating said oscillator.

References Cited

UNITED STATES PATENTS

| | | | |
|---|---|---|---|
| 3,281,694 | 10/1966 | Clark | 325—30 |
| 3,368,038 | 2/1968 | Ringelhaan | 178—70 |

ROBERT L. GRIFFIN, Primary Examiner

J. A. BRODSKY, Assistant Examiner

U.S. Cl. X.R.

178—67, 88; 325—30